(12) United States Patent
Homma et al.

(10) Patent No.: US 10,854,913 B2
(45) Date of Patent: Dec. 1, 2020

(54) SOLID ELECTROLYTE AND ALL-SOLID BATTERY

(71) Applicant: FUJITSU LIMITED, Kawasaki (JP)

(72) Inventors: Kenji Homma, Atsugi (JP); Satoru Watanabe, Atsugi (JP); Tamotsu Yamamoto, Tachikawa (JP)

(73) Assignee: FUJITSU LIMITED, Kawasaki (JP)

( * ) Notice: Subject to any disclaimer, the term of this patent is extended or adjusted under 35 U.S.C. 154(b) by 231 days.

(21) Appl. No.: 16/045,074

(22) Filed: Jul. 25, 2018

(65) Prior Publication Data

US 2018/0331390 A1 Nov. 15, 2018

Related U.S. Application Data

(63) Continuation of application No. PCT/JP2016/052515, filed on Jan. 28, 2016.

(51) Int. Cl.

| | | |
|---|---|---|
| *H01M 10/0562* | (2010.01) | |
| *H01M 10/0525* | (2010.01) | |
| *H01M 4/58* | (2010.01) | |
| *H01M 4/36* | (2006.01) | |
| *H01M 4/485* | (2010.01) | |
| *H01M 4/505* | (2010.01) | |
| *H01M 4/525* | (2010.01) | |
| *H01M 4/66* | (2006.01) | |
| *H01M 4/02* | (2006.01) | |

(52) U.S. Cl.
CPC ....... *H01M 10/0562* (2013.01); *H01M 4/364* (2013.01); *H01M 4/485* (2013.01); *H01M 4/505* (2013.01); *H01M 4/525* (2013.01); *H01M 4/5815* (2013.01); *H01M 4/661* (2013.01); *H01M 10/0525* (2013.01); *H01M 2004/027* (2013.01); *H01M 2004/028* (2013.01); *H01M 2300/0071* (2013.01)

(58) Field of Classification Search
CPC .......... H01M 4/36; H01M 4/66; H01M 4/485; H01M 4/525; H01M 4/364; H01M 4/5815; H01M 4/661; H01M 4/505; H01M 10/0562; H01M 10/0525; H01M 2300/0071; H01M 2004/027; H01M 2004/028

See application file for complete search history.

(56) References Cited

U.S. PATENT DOCUMENTS

| | | | | |
|---|---|---|---|---|
| 6,090,505 A | * | 7/2000 | Shimamura | ............. H01M 4/13 429/209 |
| 2009/0068563 A1 | * | 3/2009 | Kanda | ............... H01M 10/0525 429/306 |

(Continued)

FOREIGN PATENT DOCUMENTS

| | | |
|---|---|---|
| JP | 2002-216537 | 8/2002 |
| JP | 2004-95342 | 3/2004 |

(Continued)

OTHER PUBLICATIONS

JP2012094445 MT (Year: 2012).*

(Continued)

*Primary Examiner* — Alexander Usyatinsky
(74) *Attorney, Agent, or Firm* — Xsensus LLP

(57) ABSTRACT

Provided is a solid electrolyte including electrolyte particles, wherein each of the electrolyte particles includes at least one of an O—S—O structure and an O—S—OH structure.

15 Claims, 7 Drawing Sheets

(56) References Cited

U.S. PATENT DOCUMENTS

2014/0127588 A1\* 5/2014 Kato .................... H01M 4/625
429/304
2014/0193695 A1\* 7/2014 Hoshina ............ H01M 10/0525
429/156
2015/0044575 A1 2/2015 Kawaji et al.

FOREIGN PATENT DOCUMENTS

| JP | 2008-285388 | | 11/2008 |
| JP | 2008285388 | \* | 11/2008 |
| JP | 2009-245913 | | 10/2009 |
| JP | 2010-33876 | | 2/2010 |
| JP | 2012-14892 | | 1/2012 |
| JP | 2012-94445 | | 5/2012 |
| JP | 2012094445 | \* | 5/2012 |
| JP | 2015-35334 | | 2/2015 |
| JP | 2016-39128 | | 3/2016 |
| WO | WO 2012/164724 A1 | | 12/2012 |
| WO | WO 2013/136446 A1 | | 9/2013 |

OTHER PUBLICATIONS

2017563476, Decision_to_Grant_a_Patent_(TRANSLATED),Jun. 2, 2020 (Year: 2020).\*
International Search Report dated May 10, 2016 in PCT/JP2016/052515, filed on Jan. 28, 2016 (with English Translation).
Written Opinion dated May 10, 2016 in PCT/JP2016/052515, filed on Jan. 28, 2016 (with Partial English Translation).

\* cited by examiner

SOLID ELECTROLYTE AND ALL-SOLID BATTERY

CROSS-REFERENCE TO RELATED APPLICATION

This application is a continuation application of International Application PCT/JP2016/052515 filed on Jan. 28, 2016 and designated the U.S., the entire contents of which are incorporated herein by reference.

FIELD

The embodiments discussed herein relate to a solid electrolyte and an all-solid battery.

BACKGROUND

Secondary battery cells that are safe and have high reliability under any global environment are important for the energy harvesting technology where electricity generated from small energy, such as solar energy, vibration energy, and body temperatures of humans and animals, is stored and used for sensors, radio transmission power, etc.

There is a concern associated with liquid-based batteries using an organic solvent solution, which are currently widely used that a positive electrode active material is deteriorated as cycles are repeated and a battery capacity may decrease. Moreover, there is another concern that an organic electrolyte solution within the liquid-based battery may be ignited due to a short circuit of the battery caused by formation of dendrites and fire may be started. In terms of down-sizing, moreover, the liquid-based battery has many disadvantages in shape processing, etc., such as assurance of a thickness for inserting a separator which separates a positive electrode and a negative electrode.

Therefore, an all-solid battery whose constitutional materials are all solids has recently attracted attentions (see, for example Japanese Patent Application Laid-Open (JP-A) No. 2010-33876). The all-solid battery has advantages that there is not concern about leakage of a liquid or combustion, excellent cycle properties can be obtained, and there is a high degree of freedom regarding a shape thereof.

As an inexpensive production method of an all-solid battery, a green sheet method has been known. The green sheet method is a method where powder of a positive electrode, powder of negative electrode, and powder of a solid electrolyte are laminated into the form of layers, followed by performing thermoforming to process into a piece of a sheet. According to this method, a sintering process of 1,000° C. or higher is desired to reduce grain-boundary resistance between particles of the solid electrolyte to $1 \times 10^{-5}$ S/cm or lower. When sintering of 1,000° C. is performed, however, there is a problem that a positive electrode material and a negative electrode material are decomposed and a resultant does not function as a battery.

Accordingly, there is currently a need for a solid electrolyte that can yield a layered product having low resistance through processing of a low temperature.

SUMMARY

The disclosed solid electrolyte includes electrolyte particles, wherein each of the electrolyte particles includes at least one of an O—S—O structure and an O—S—OH structure.

Moreover, the disclosed all-solid battery includes a positive electrode active material-containing layer, a negative electrode active material-containing layer, and a solid electrolyte layer disposed between the positive electrode active material-containing layer and the negative electrode active material-containing layer, wherein the solid electrolyte layer is a layer composed of the solid electrolyte.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (Solid Electrolyte)

Figure 1:
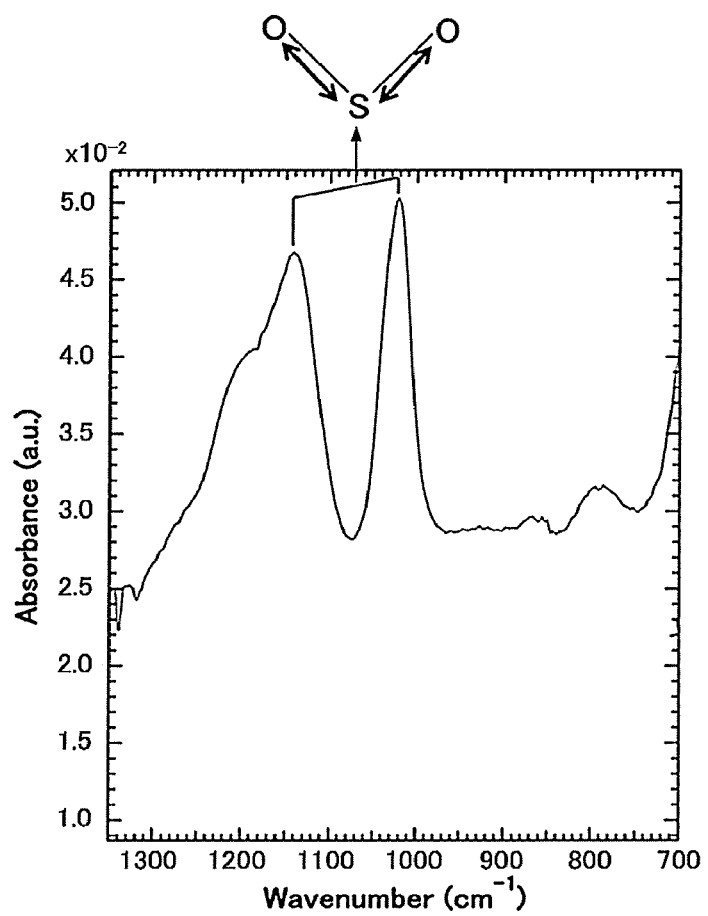
FIG. 1 is a graph depicting one example of a FT-IR spectrum exhibiting absorptions of an O—S—O structure and an O—S—OH structure.

The disclosed solid electrolyte includes electrolyte particles.

Each of the electrolyte particles includes at least one of an O—S—O structure and an O—S—OH structure.

The disclosed technique aims to provide a solid electrolyte, with which a layered product of low resistance can be obtained by processing of a low temperature, and an all-solid battery using the solid electrolyte.

According to one aspect of the present disclosure, a solid electrolyte, with which a layered product of low resistance can be obtained by processing of a low temperature, can be provided. According to one aspect of the present disclosure, moreover, an all-solid battery that can be produced at a low temperature can be provided.

When the solid electrolyte includes at least one of an O—S—O structure and an O—S—OH structure, a layered product having low resistance can be obtained without heating at a high temperature during processing of the solid electrolyte into a layer. The reason therefor has not clearly been understood, but it is assumed that a water component is appropriately applied to surfaces of the electrolyte particles owing to the presence of the O—S—O structure and the O—S—OH structure, and an ion conduction path is created.

Each of the electrolyte particles preferably includes a transition metal of Group 4 or Group 5 in the periodic table, and S in at least one of the O—S—O structure and the O—S—OH structure is preferably bonded to the transition metal.

The transition metal is at least one selected from the group consisting of Ti, V, Cr, Mn, Fe, Co, Ni, Cu, Zn, Zr, and Nb, and more preferably Ti, because the above-listed transition metals are central metals each capable of forming a 6-co-ordinated octahedral molecule with oxygen (O) and sulfur (S) within a crystal structure.

Each of the electrolyte particles preferably includes a base particle and at least one of the O—S—O structure and the O—S—OH structure.

<Base Particles>

The base particles are not particularly limited and may be appropriately selected depending on the intended purpose, as long as the base particles are a material known as a solid electrolyte material. Examples of the base particles include oxide-based solid electrolyte and sulfide-based solid electrolyte.

Examples of the oxide-based solid electrolyte include the following materials.

$Li_xLa_yTiO_3$
x=0.3 to 0.7, y=0.3 to 0.7
$Li_7La_3Zr_2O_{12}$
$Li_5La_3Ta_2O_{12}$
$Li_{3.5}Zn_{0.25}GeO_4$
$LiTi_2P_3O_{12}$
$Li_{1+x+y}(Al,Ga)_x(Ti,Ge)_{2-x}Si_yP_{3-y}O_{12}$
$0 \leq x \leq 1$, $0 \leq y \leq 1$
$LiNbO_3$
$Li_3PO_4$
LiPON
LiPOD D is at least one selected from the group consisting of Ti, V, Cr, Mn, Fe, Co, Ni, Cu, Zr, Nb, Mo, Ru, Ag, Ta, W, Pt, and Au.

LiAON

A is at least one selected from the group consisting of Si, B, Ge, Al, C, Ga, etc.

Among the above-listed materials, $Li_{0.33}La_{0.55}TiO_3$, $Li_7La_3Zr_2O_{12}$, and $LiNbO_3$ are preferable in view of easiness of introduction of oxygen defects and easiness of substitution of lost oxygen with sulfur.

Sizes and shapes of the base particles are not particularly limited and may be appropriately selected depending on the intended purpose.

Whether the electrolyte particles have at least one of the O—S—O structure and the O—S—OH structure can be confirmed, for example, by Fourier transform infrared spectroscopy (FT-IR).

As illustrated in FIG. 1, for example, absorptions based on stretching vibrations of O—S—O can be confirmed at 1,000 cm$^{-1}$ to 1,050 cm$^{-1}$ and 1,100 cm$^{-1}$ to 1,150 cm$^{-1}$. The presence of the O—S—O structure and the O—S—OH structure can be confirmed by the above-mentioned absorptions.

Note that, in the present specification, the O—S—O structure and the O—S—OH structure are different from a sulfonic acid group (—SO$_3$H).

Moreover, a distinction between the O—S—O structure and the O—S—OH structure can be confirmed by FT-IR spectroscopy.

Figure 2:
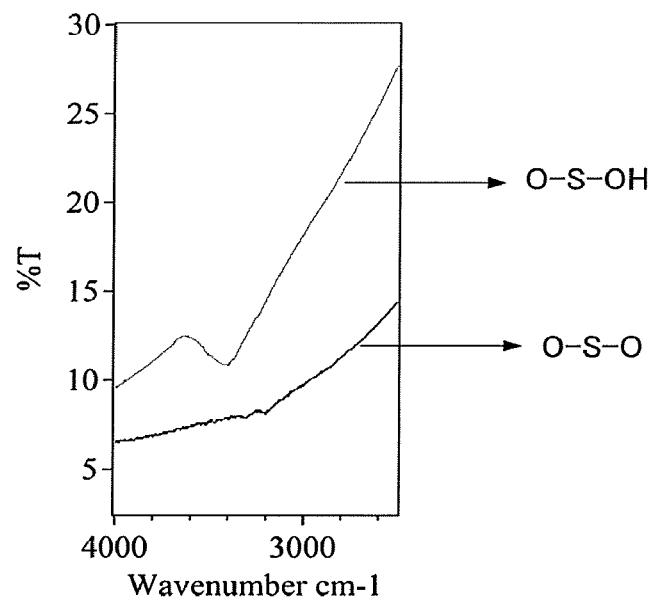
FIG. 2 is a graph depicting one example of a FT-IR spectrum at the range of from 3,000 cm$^{-1}$ to 4,000 cm$^{-1}$ associated with the O—S—O structure and the O—S—OH structure.

For example, as depicted in FIG. 2, the one having absorption based on OH at around 3,600 cm$^{-1}$ is the O—S—OH structure and the one having no absorption based on OH at around 3,600 cm$^{-1}$ is the O—S—O structure.

<Water Component>

The solid electrolyte preferably includes a water component. Since the solid electrolyte includes the water component, an excellent ion conduction path can be created. The water component is preferably included on a surface of each of the electrolyte particles.

In the present specification, the term "water component" includes OH$^-$ and H$^+$, as well as H$_2$O. Moreover, a state of the water component in the solid electrolyte is not particularly limited and may be appropriately selected depending on the intended purpose. For example, the water component may be a cluster or H$_3$O$^+$ (oxonium ion).

An analysis method that directly confirms in what structure and state the water component is present on surfaces of the electrolyte particles has not been known. Examples of a method for indirectly confirming include thermogravimetric-differential thermal analysis-mass spectroscopy (TG-DTA-MS) described later. In TG-DTA-MS, the water component is detected as H$_2$O.

In view of excellent ion conduction, the solid electrolyte preferably includes the water component in an amount of from 0.8% by mass to 2.4% by mass, and more preferably in an amount of from 1.4% by mass to 2.4% by mass. The reason for this is as follows.

The present inventors investigated a relationship between the amount of the water component in the solid electrolyte and the ion conductivity.

First, the solid electrolyte was stored for 12 hours in an environment having the predetermined humidity and a temperature of 25° C. Thereafter, a relationship between the storage humidity environment and the ion conductivity of the solid electrolyte was investigated. The storage humidity environments were environments of a glove box (GB), a dry room, and relative humidity of 40%, 50%, 60%, 70%, 80%, and 90%. The results are presented in FIG. 3.

Figure 3:
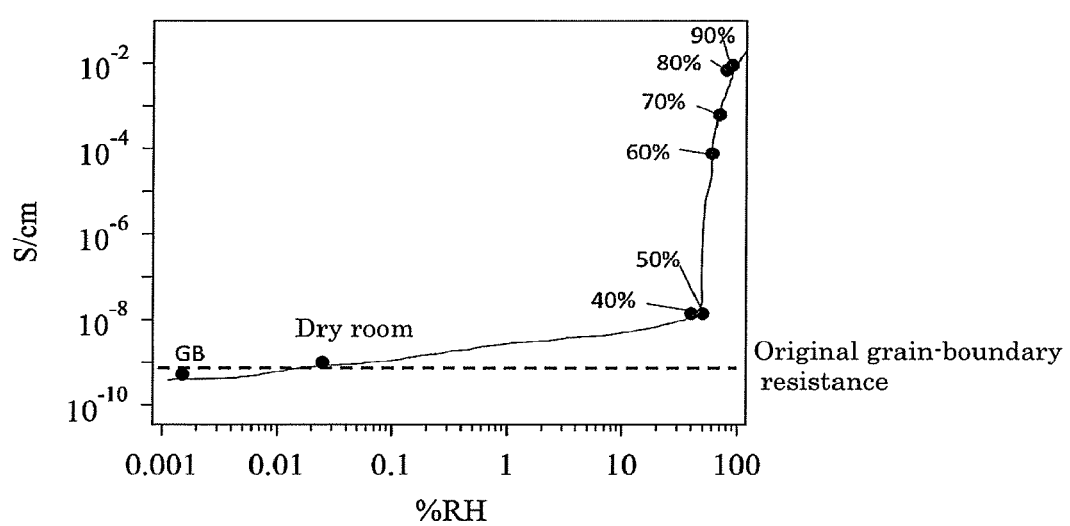
FIG. 3 is a graph depicting a relationship between a storage humidity environment and an ion conductivity.

It can be confirmed from FIG. 3 that the solid electrolyte has only an ion conductivity corresponding to the original grain-boundary resistance under the humidity environment of the dry room or lower, but the ion conductivity improved at the relative humidity of 40% or higher. Moreover, the ion conductivity of 10$^{-4}$ S/cm or higher is obtained at the relative humidity of 60% or higher.

Figure 4:
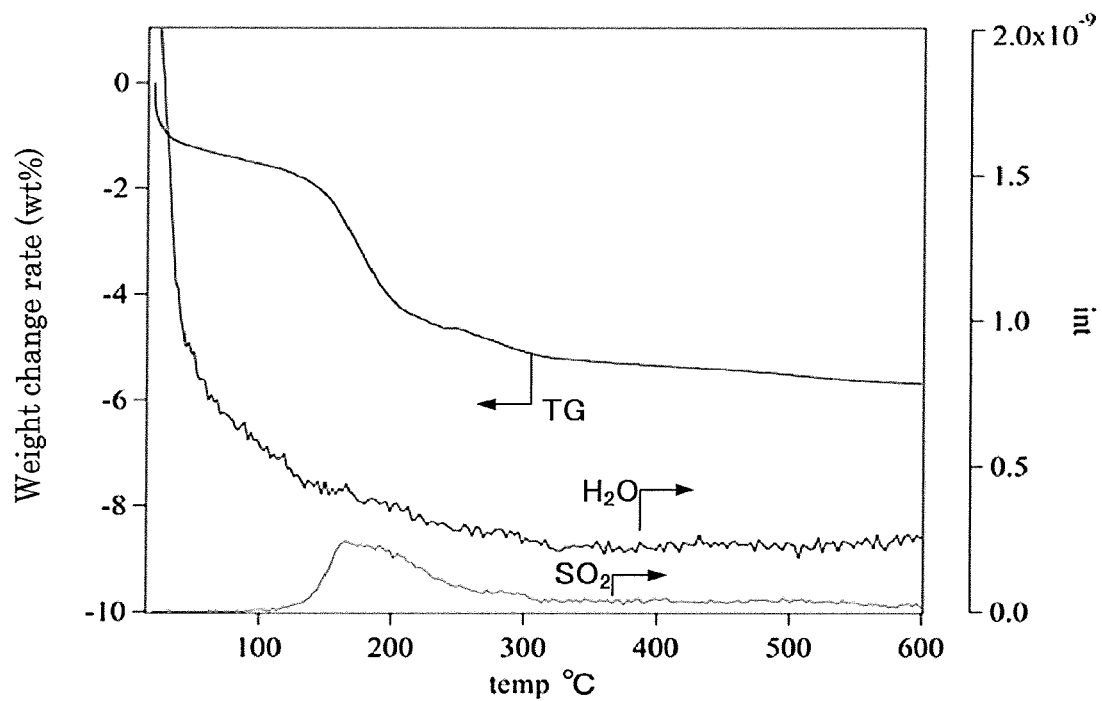
FIG. 4 is a graph depicting one example of a result of TG-DTA-MS of the solid electrolyte.

Next, the TG-DTA-MS analysis was performed on the solid electrolyte and a result as depicted in FIG. 4 was obtained. In the analysis, a weight reduction of the solid electrolyte, desorption of the water component and desorption of SO$_2$ from the solid electrolyte can be confirmed. Moreover, it can be confirmed that the water component is desorbed even at a low temperature and SO$_2$ is desorbed at 100° C. or higher. Specifically, it can be understood that an amount of the water component of the solid electrolyte can be confirmed by TG analysis performed at a low temperature.

Therefore, the TG analysis was performed on the solid electrolyte for both of the storage humidity environment of 40% and the storage humidity environment of 60%. An amount of the desorbed water component (i.e., an amount of the water component in the solid electrolyte) was measured by flowing dry argon at 25° C. at which desorption of SO$_2$ does not occur. The measurement was performed for 60 minutes. The weight reduction curve became close to a saturation state after 10 minutes and was completely saturated after 20 minutes.

Therefore, it could be confirmed from the weight reduction of after 20 minutes that an amount of the water component of the solid electrolyte in the storage humidity environment of 40% was 0.8% by mass.

Moreover, it could be confirmed from the weight reduction of after 20 minutes that an amount of the water component of the solid electrolyte in the storage humidity environment of 60% was 1.4% by mass.

Moreover, an amount of the water component of the solid electrolyte in the storage humidity environment of 90% is calculated as 2.4% by mass from the results above and the curve of FIG. 3.

It is guided from the results above that the solid electrolyte preferably includes the water component in an amount of from 0.8% by mass to 2.4% by mass, more preferably from 1.4% by mass to 2.4% by mass, in view of excellent ion conduction.

A structure of the solid electrolyte is not particularly limited and may be appropriately selected depending on the intended purpose. Examples of the structure of the solid electrolyte include particles and layers. Specifically, the solid electrolyte may be powder obtained by gathering the electrolyte particles or layered product obtained by processing the electrolyte particles into a layer.

<Production Method of Solid Electrolyte>

A production method of the solid electrolyte is not particularly limited and may be appropriately selected depending on the intended purpose. For example, the production method includes sulfurization processing and surface stabilization processing, and may further include other processing, such as reduction processing, according to the necessity.

<<Sulfurization Processing>>

The sulfurization processing is not particularly limited and may be appropriately selected depending on the intended purpose, as long as the sulfurization processing is a process where the base particles are allowed to react with sulfur to give S on surfaces of the base particles. Examples of the sulfurization processing include a method where the base particles and sulfur are mixed and heated in vacuum. As a result, for example, a structure where S is bonded to a transition metal (Ti) on a surface of the base particle, as presented by the following partial structural formula, can be obtained.

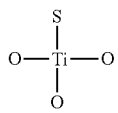

A ratio between the base particles and the sulfur for the mixing is not particularly limited and may be appropriately selected depending on the intended purpose. Examples of the ratio include a mass ratio (base particles:sulfur) of 1.0:0.05 to 1.0:0.5.

A heating temperature for the heating is not particularly limited and may be appropriately selected depending on the intended purpose. Examples of the heating temperature include a temperature from 150° C. to 250° C.

A heating duration for the heating is not particularly limited and may be appropriately selected depending on the intended purpose. Examples of the heating duration include a duration from 1 hour to 5 hours.

<<Surface Stabilization Processing>>

The surface stabilization processing is not particularly limited and may be appropriately selected depending on the intended purpose, as long as the surface stabilization processing is a process where after the sulfurization processing, the base particles to the surfaces of which S has been given are exposed to moisture to oxidize S. Examples of the surface stabilization processing include a method where the base particles to surfaces of which S has been given are exposed to high-humidity atmosphere.

By oxidizing S through the surface stabilization processing, for example, S bonded to a transition metal (Ti) of surfaces of the base particles is oxidized and an O—S—O structure or O—S—OH structure as represented by the following partial structural formula can be obtained.

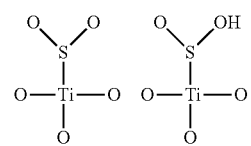

As described above, electrolyte particles having at least one of an O—S—O structure and an O—S—OH structure on surfaces of the electrolyte particles can be obtained.

In the surface stabilization processing, $H_2O$ is used during oxidization of S. Therefore, a water component is present on surfaces of the electrolyte particles after the surface stabilization processing.

<<Reduction Processing>>

The reduction processing is not particularly limited and may be appropriately selected depending on the intended purpose, as long as the reduction processing is a pretreatment of the sulfurization processing and a process where surfaces of the base particles are reduced. Examples of the production processing include a method where heating is performed in a hydrogen atmosphere.

Depending on a storage state, surfaces of the base particles may be oxidized. Therefore, the surfaces of the base particles are reduced by performing the reduction processing, and the subsequent sulfurization processing is easily performed.

(All-Solid Battery)

The disclosed all-solid battery includes at least a positive electrode active material-containing layer, a negative electrode active material-containing layer, and a solid electrolyte layer disposed between the positive electrode active material-containing layer and the negative electrode active material-containing layer. The all-solid battery may further include other members according to the necessity.

<Positive Electrode Active Material-Containing Layer>

The positive electrode active material-containing layer is not particularly limited and may be appropriately selected depending on the intended purpose, as long as the positive electrode active material-containing layer is a layer including a positive electrode active material.

The positive electrode active material-containing layer may be the positive electrode active material itself, or a mixture in which the positive electrode active material and the solid electrolyte are mixed.

In the case where the positive electrode active material-containing layer is a layer formed of a mixture of the positive electrode active material and the solid electrolyte, a ratio between the positive electrode active material and the solid electrolyte in the positive electrode active material-containing layer is not particularly limited and may be appropriately selected depending on the intended purpose. As the ratio, a mass ratio (positive electrode active material:

solid electrolyte) is preferably from 1.0:0.1 to 1.0:2.0, more preferably from 1.0:0.3 to 1.0:1.5, and particularly preferably from 1.0:0.5 to 1.0:1.0.

The positive electrode active material is not particularly limited and may be appropriately selected depending on the intended purpose. Examples of the positive electrode active material include lithium-containing complex oxide. The lithium-containing complex oxide is not particularly limited and may be appropriately selected depending on the intended purpose, as long as the lithium-containing complex oxide is a complex oxide including lithium and another metal. Examples of the lithium-containing complex oxide include $LiCoO_2$, $LiNiO_2$, $LiCrO_2$, $LiVO_2$, $LiM_xMn_{2-x}O_4$ (M is at least one selected from the group consisting of Co, Ni, Fe, Cr, and Cu, $0 \leq x < 2$), $LiFePO_4$, $LiCoPO_4$, $LiNiPO_4$, and $LiNi_{1/3}Mn_{1/3}CO_{1/3}O_2$.

The average thickness of the positive electrode active material-containing layer is not particularly limited and may be appropriately selected from, for example, a range of about 0.1 mm to about 1.0 mm depending on a target battery capacity or battery shape.

<Solid Electrolyte Layer>

The solid electrolyte layer is composed of the disclosed solid electrolyte.

The average thickness of the solid electrolyte layer is not particularly limited and may be appropriately selected, depending on the intended purpose, from a thickness range with which the positive electrode and the negative electrode do not cause a short circuit. The average thickness is preferably from 0.05 mm to 3.0 mm, more preferably from 0.1 mm to 2.0 mm, and particularly preferably from 0.5 mm to 1.5 mm.

<Negative Electrode Active Material-Containing Layer>

The negative electrode active material-containing layer is not particularly limited and may be appropriately selected depending on the intended purpose, as long as the negative electrode active material-containing layer is, for example, a layer including a negative electrode active material.

The negative electrode active material-containing layer may be the negative electrode active material itself, or a mixture in which the negative electrode active material and the solid electrolyte are mixed.

In the case where the negative electrode active material-containing layer is a layer formed of a mixture of the negative electrode active material and the solid electrolyte, a ratio between the negative electrode active material and the solid electrolyte in the negative electrode active material-containing layer is not particularly limited and may be appropriately selected depending on the intended purpose. As the ratio, a mass ratio (negative electrode active material: solid electrolyte) is preferably 1.0:0.1 to 1.0:2.0, more preferably 1.0:0.3 to 1.0:1.5, and particularly preferably 1.0:0.5 to 1.0:1.0.

The negative electrode active material is not particularly limited and may be appropriately selected depending on the intended purpose. Examples of the negative electrode active material include lithium, lithium alloys, $Li_4Ti_5O_{12}$, $LiVO_3$, amorphous carbon, natural graphite, artificial graphite, $TiS_2$, $TiO_2$, and $CoO_2$.

The average thickness of the negative electrode active material-containing layer is not particularly limited and may be appropriately selected depending on the intended purpose. The average thickness is preferably from 0.05 mm to 3.0 mm, more preferably from 0.1 mm to 2.0 mm, and particularly preferably from 0.5 mm to 1.5 mm.

<Other Members>

The above-mentioned other members are not particularly limited and may be appropriately selected depending on the intended purpose. Examples of the above-mentioned other members include a positive electrode collector, a negative electrode collector, and a battery case.

<<Positive Electrode Collector>>

A size and structure of the positive electrode collector are not particularly limited and may be appropriately selected depending on the intended purpose.

Examples of the material of the positive electrode collector include die steel, stainless steel, aluminium, aluminium alloys, titanium alloys, copper, and nickel.

Examples of a shape of the positive electrode collector include foils, plates, and meshes.

<<Negative Electrode Collector>>

A size and structure of the negative electrode collector are not particularly limited and may be appropriately selected depending on the intended purpose.

Examples of a material of the negative electrode collector include die steel, gold, indium, nickel, copper, and stainless steel.

Examples of a shape of the negative electrode collector include foils, plates, and meshes.

<<Battery Case>>

The battery case is not particularly limited and may be appropriately selected depending on the intended purpose. Examples of the battery case include known laminate films usable in all-solid batteries known in the art. Examples of the laminate films include laminate films formed of resins, and films each prepared by depositing, through vapor deposition, a metal on a laminate film formed of a resin.

A shape of the all-solid battery is not particularly limited and may be appropriately selected depending on the intended purpose. Examples of the shape include cylinder shapes, square shapes, button shapes, coin shapes, and flat shapes.

The all-solid battery is preferably a so-called thin-film all-solid battery, in which the positive electrode active material-containing layer, the solid electrolyte layer, and the negative electrode active material-containing layer are laminated by a vapor phase method because such an all-solid battery excels in a cycle service life.

Figure 5:
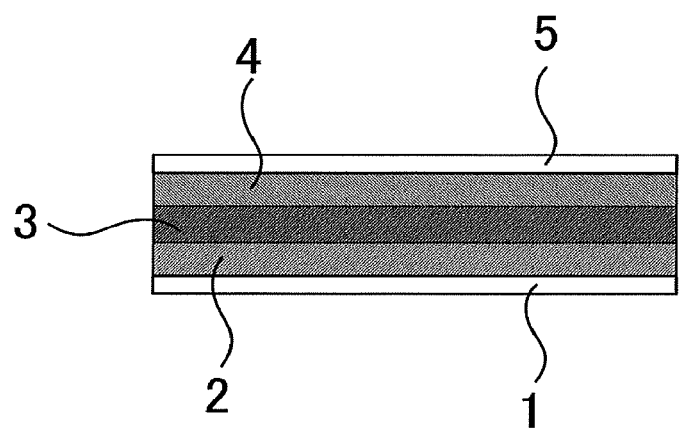
FIG. 5 is a schematic cross-sectional view illustrating one example of the all-solid battery.

FIG. 5 is a schematic cross-sectional view illustrating one example of the disclosed all-solid battery. In the all-solid battery of FIG. 5, a positive electrode active material-containing layer 2, a solid electrolyte layer 3, a negative electrode active material-containing layer 4, and a negative electrode collector 5 are laminated on a positive electrode collector 1 in the order as mentioned.

A principle of an operation of the all-solid battery will be described by taking a lithium ion all-solid secondary battery cell as an example. During charging, Li is ionized and comes out from the positive electrode active material-containing layer to move in the solid electrolyte to the side of the negative electrode active material-containing layer, and then is inserted into the negative electrode active material-containing layer. During discharging, meanwhile, Li ions inserted into the negative electrode active material-containing layer move in the solid electrolyte to the side of the positive electrode active material-containing layer, and then return back to the positive electrode active material-containing layer. As described above, charging and discharging of the lithium ion battery cell are performed by moving Li ions between the positive electrode and the negative electrode.

<Production Method of all-Solid Battery>

A production method of the all-solid battery is not particularly limited and may be appropriately selected depending on the intended purpose. Examples of the production method include a method where powder of a material for forming a positive electrode active material-containing layer, a powderous solid electrolyte, and powder of a material for forming a negative electrode active material are laminated into layers and the layers are subjected to compression molding.

Use of the solid electrolyte can realize production of an all-solid battery having excellent battery properties at a low temperature without heating at a high temperature during the compression molding.

Examples of pressure of the compression molding include pressure of from 127 kgf/cm$^2$ to 1,270 kgf/cm$^2$.

Examples of a temperature of the compression molding include room temperature.

EXAMPLES

Examples of the disclosed technology will be described hereinafter but Examples below shall not be construed as to limit a scope of the disclosed technology.

Example 1

<Synthesis Method of Solid Electrolyte>
<<Reduction Processing>>

LLTO particles ($Li_{0.33}La_{0.55}TiO_3$, TOYOSHIMA MANUFACTURING CO., LTD.) having the average particle diameter of 2 μm were formed into a pellet by compression molding. The obtained pellet was subjected to reduction processing for 30 minutes under a hydrogen atmosphere of 900° C. The compressed powder after the reduction was regarded as LLTOH.

The obtained LLTOH was sealed under a $N_2$ atmosphere and the resultant was moved into a glove boxy (GB) of an Ar atmosphere having a dew point of −70° C.
<<Sulfurization Processing>>

The obtained LLTOH was mixed with sulfur (S) at a mass ratio (LLTOH sulfur) of 10:1 by using an agate mortar. The obtained powder was formed into a pellet by compression molding, followed by putting the pellet in a quartz tube. The internal pressure of the quartz tube was reduced to 10 Pa and the quartz tube was vacuum sealed using a gas burner. The vacuum-sealed quartz tube was fired for 2 hours at 200° C. After slowly cooling the quartz tube, the quartz tube was moved inside GB and the quartz tube was opened in the GB to thereby obtain sulfurized LLTOHS.

Note that, all of the operation of the mixing and the operation of putting the pellet in the quartz tube were performed inside the GB.
<<Surface Stabilization Processing>>

The obtained LLTOHS was exposed to the atmospheric atmosphere of 25° C. and 90% RH for 6 hours to adsorb water ($H_2O$) on a surface of the LLTOHS solid electrolyte to thereby oxidize the surface of the solid electrolyte.
<Fabrication of Compressed Powder Battery>

A compressed powder battery (all-solid battery) was produced using a PET tube that had a diameter of 10 mm and was equipped with a SKD11 jig. Specifically, the compressed powder battery was produced by the following method. $LiCoO_2$(LCO) was used as a positive electrode active material and $TiS_2$ was used as a negative electrode active material.

The LLTOHS obtained after the oxidization processing was used as a solid electrolyte.

A positive electrode mixture and a negative electrode mixture were produced in a production atmosphere that was an atmosphere of 25° C. and 55% RH.

The positive electrode mixture obtained by mixing 6 mg of LCO and 4 mg of LLTOHS was used for a positive electrode.

The negative electrode mixture obtained by mixing 3 mg of $TiS_2$ and 2 mg of LLTOHS was used for a negative electrode.

As a solid electrolyte, 70 mg of the LLTOHS obtained after the oxidization processing was used.

The PET tube was charged with the positive electrode mixture (10 mg), the solid electrolyte (70 mg), and the negative electrode mixture (5 mg) in the order as mentioned, and compression molding was performed by pressing with the SKD11 jig. The compression molding was performed at 25° C. where the pressure was 1,270 kgf/cm$^2$ and the compression duration was 30 seconds.
<Control of Moisture Content after Oxidization Processing>

An operation of charging was performed on the produced all-solid battery with 2.2 V being the upper limit. The battery which reached 2.2 V in the charging process was discharged with a constant electric current of 0.25 mA. As a result, 20% of the discharge capacity relative to a theoretical capacity of the positive electrode was confirmed. An ion conductivity was calculated from the internal resistance. As a result, the ion conductivity was 1.4×10$^{-4}$ S/cm.

FT-IR spectroscopy was performed in order to confirm a surface structure of the LLTOHS after the oxidization processing. As a result, it was confirmed that the O—S—O (or O—S—OH) structure was formed on the surface of the solid electrode. The result of the FT-IR spectroscopy is presented in FIG. 6.

Figure 6:
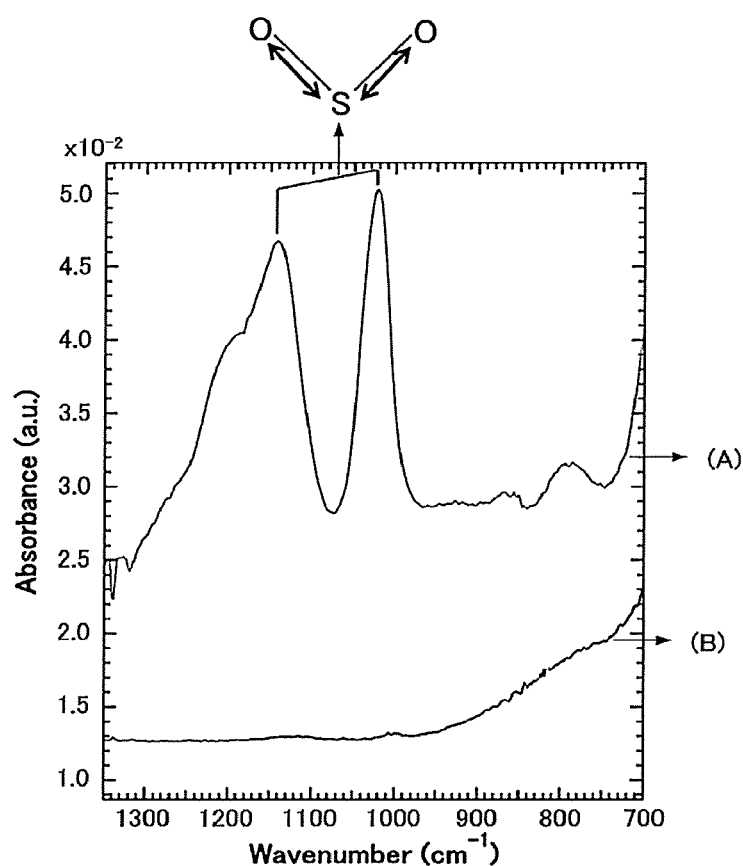
FIG. 6 is a graph depicting the FT-IR spectra of the LLTOHS before and after the oxidization processing.

In FIG. 6, the curve indicated with (A) is a FT-IR spectrum of the LLTOHS after the oxidization processing, and the curve indicated with (B) is a FT-IR spectrum of the LLTOHS before the oxidization processing.

The measuring conditions of the FT-IR are presented below.

As a measuring device, Nicolet8700 available from Thermo Fisher Scientific K.K. was used.

Unpolarized infrared light was applied at an incident angle of 80° with reflective optical system.

A glower lamp (the Nernst glower) was used as a light source.

The Michelson interferometer and triglycine sulfate (TGS)-based detector were used.

The measured interference pattern was subjected to the Fourier transform.

The wavenumber resolution of the device was 4 cm$^{-1}$.

The cumulative number was 64 times.
<<TG-DTA-MS Measurement>>

The result of TG-DTA-MS measurement of the LLTOHS after the oxidization processing is presented in FIG. 4.

The measuring conditions of TG-DTA-MS are presented below.

Measuring device: Thermo Mass Photo available from Rigaku Corporation

Measuring atmosphere: He (dew point temperature: −76° C.)

Gas flow rate: 300 mL/min

Temperature range: room temperature to 1,000° C. to room temperature

Heating speed: 10° C./min

<Ms Conditions>

Ionization method: EI method (about 70 eV)

Mass range: SCAN method, m/z=10 to 200

The weight change (1.8% by mass) was observed from room temperature to about 100° C. due to evaporation of water. At around 100° C., $SO_2$ gas was detected and it was confirmed that the O—S—O structure of the surface, which constituted a high ion conduction layer, was desorbed. It was assumed that there was a high ion conduction state controlled by charging voltage of 2.2 V between room temperature and 100° C. at which desorption of the O—S—O structure started. However, only a low ion conductivity of about $10^{-8}$ S/cm was exhibited even when the solid electrolyte before reaching 100° C. was taken out and the ion conductivity of the solid electrolyte was measured.

The above-mentioned result indicates that the accuracy of control of the water component amount is low through evaporation of water with heat and it is difficult to create a high ion conduction state. Specifically, it means that in the all-solid battery composed of the structure of the positive electrode active material-containing layer/the solid electrolyte/the negative electrode active material-containing layer, the control of the water component amount of the surface of the solid electrolyte is preferably performed by electrolysis of the water component with the battery potential of 2.2 V. The reason therefor is as follows.

2.5 V Charging

Figure 7:
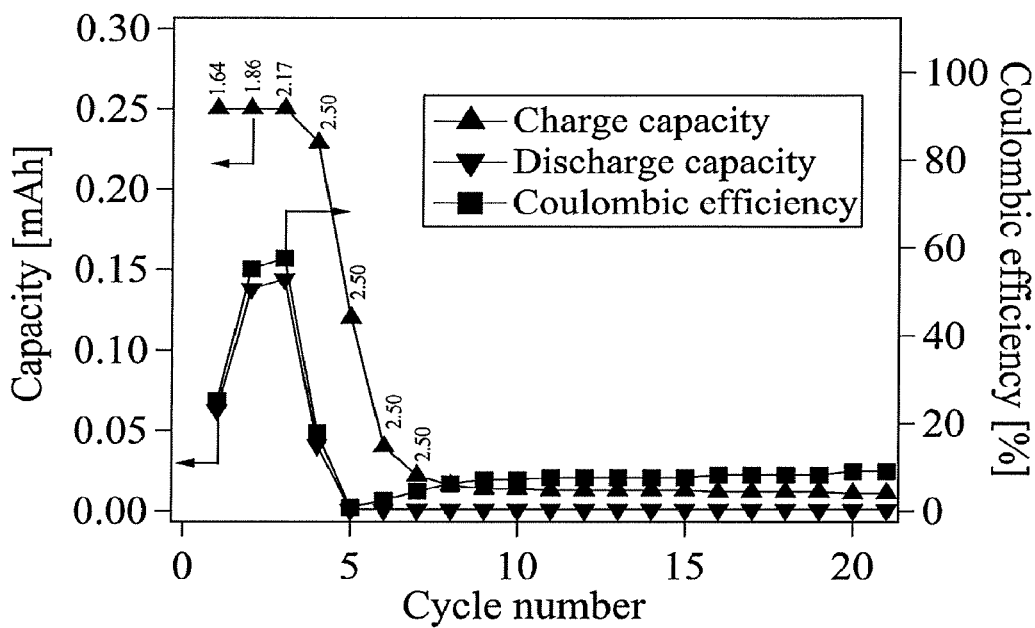
FIG. 7 is a graph depicting one example of a discharge capacity when charged at 2.5 V.

The maximum discharge capacity of the all-solid battery when the discharge voltage reached 2.5 V is presented in FIG. 7. In FIG. 7, the numerical value marked at each plot is termination voltage when the charging of the constant current having the electric current density of 0.31 mA/cm$^2$ is cut off 1 hour later.

Since almost all of the charge electric current was used for decomposition of excessive adsorbed water up to 2.2 V, charging of the all-solid battery was not performed. As a result, the Cloulombic efficiency (discharge/charge×100 [%]) was low.

As the charge voltage increased up to 2.5 V thereafter, the base solid electrolyte started to be decomposed, the internal resistance increased, and the charging could not be performed to thereby lower the Cloulombic efficiency.

2.2 V Charging

Figure 8:
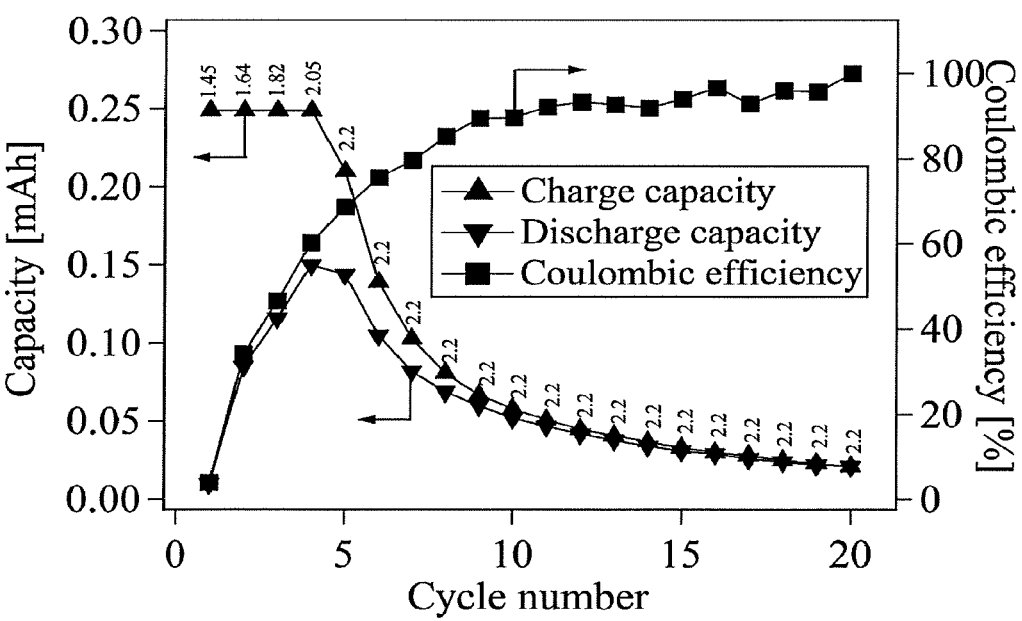
FIG. 8 is a graph depicting one example of a discharge capacity when charged at 2.2 V.

The maximum discharge capacity of the all-solid battery when the discharge voltage reached 2.2 V is presented in FIG. 8. In FIG. 8, the numerical value marked at each plot is termination voltage when the charging of the constant current having the electric current density of 0.31 mA/cm$^2$ is cut off 1 hour later.

Since almost all of the charge electric current was used for decomposition of excessive adsorbed water up to 2.2 V, charging of the all-solid battery was not performed. As a result, the Cloulombic efficiency (discharge/charge×100 [%]) was low.

As the charge voltage was continued to be controlled at 2.2 V thereafter, only the excess $H_2O$ was decomposed without decomposing the solid electrolyte and the Coulombic efficiency started to improve.

Specifically, only the excess $H_2O$ adsorbed on the solid electrolyte was decomposed by setting the battery voltage (charge voltage) to 2.2 V and the Coulombic efficiency of the battery could be improved.

<<Discharge Curve of all-Solid Battery>>

Figure 9:
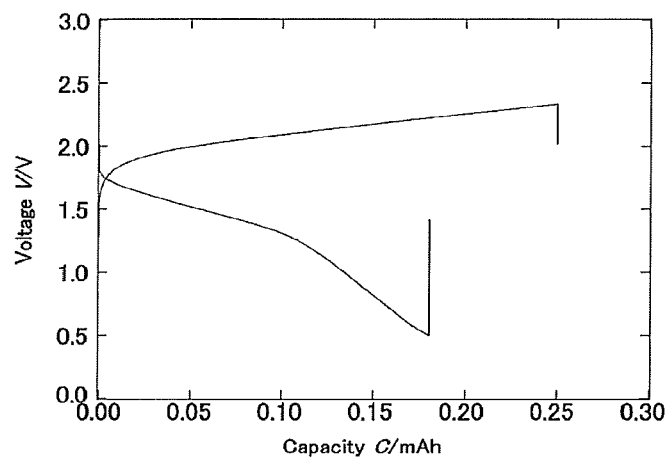
FIG. 9 is a graph depicting the discharge curve of Example 1.

A discharge curve of the all-solid battery was determined. The result is presented in FIG. 9.

Charging was performed with the constant electric current having the current density of 0.31 mA/cm$^2$ under the charging conditions that the maximum voltage was 2.2 V.

Discharging was performed with the constant electric current having the current density of 0.31 mA/cm$^2$ under the discharging conditions that the minimum voltage was 0.5 V.

The discharge curve indicated 20% of the discharge capacity relative to the theoretical capacity of LCO with the average potential of 1.5 V.

Comparative Example 1

An all-solid battery was produced in the same manner as in Example 1, except that <<Sulfurization processing>> was not performed. Since the sulfurization processing was not performed, sulfur (S) was not present on surfaces of the LLTO particles.

Figure 10:
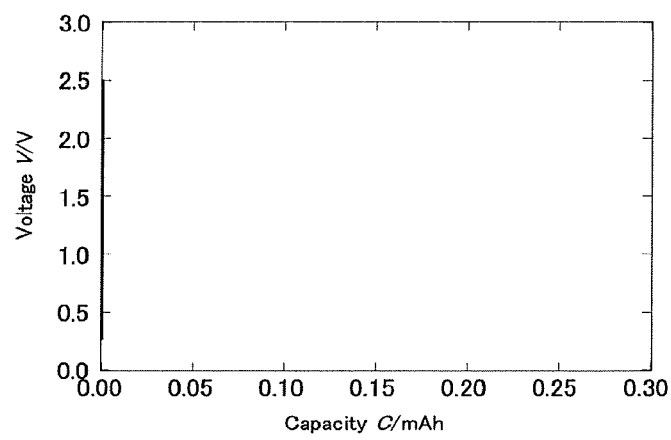
FIG. 10 is a graph depicting the discharge curve of Comparative Example 1.

A discharge curve of the obtained all-solid battery was obtained in the same manner as in Example 1. The result is presented in FIG. 10. In FIG. 10, the discharge curve vertically rises at 0.00 mAh. In FIG. 10, therefore, the discharge curve overlaps with the vertical axis. Specifically, the discharge curve exhibited the discharge capacity of 0% relative to the theoretical capacity of LCO with the average potential of 1.5 V.

Comparative Example 2

An all-solid battery was produced in the same manner as in Example 1, except that <<Surface stabilization processing>> was not performed. Since the surface stabilization processing was not performed, the O—S—O structure or the O—S—OH structure was not present although sulfur (5) was present on surfaces of the LLTO particles.

Figure 11:
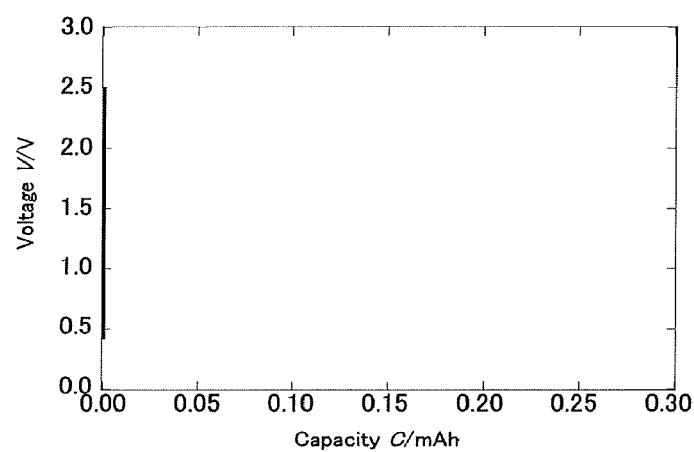
FIG. 11 is a graph depicting the discharge curve of Comparative Example 2.

A discharge curve of the obtained all-solid battery was obtained in the same manner as in Example 1. The result is presented in FIG. 11. In FIG. 11, the discharge curve vertically rises at 0.00 mAh. In FIG. 11, therefore, the discharge curve overlaps with the vertical axis. Specifically, the discharge curve exhibited the discharge capacity of 0% relative to the theoretical capacity of LCO with the average potential of 1.5 V.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. A solid electrolyte comprising:
electrolyte particles, wherein
each of the electrolyte particles includes a transition metal of Group 4 or Group 5 in the periodic table,
each of the electrolyte particles includes at least one of an O—S—O structure and an O—S—OH structure, and
S in at least one of the O—S—O structure and the O—S—OH structure is bonded to the transition metal.

2. The solid electrolyte according to claim 1,
wherein the solid electrolyte includes a water component.

3. The solid electrolyte according to claim 1,
wherein the solid electrolyte includes a water component in an amount of from 0.8% by mass to 2.4% by mass.

4. The solid electrolyte according to claim 1,
wherein the transition metal is at least one selected from the group consisting of Ti, V, Cr, Mn, Fe, Co, Ni, Cu, Zn, Zr, and Nb.

5. The solid electrolyte according to claim 1,
wherein the transition metal is Ti.

6. The solid electrolyte according to claim 1,
wherein each of the electrolyte particles includes a base particle and at least one of the O—S—O structure and the O—S—OH structure, and
the base particle is $Li_{0.33}La_{0.55}TiO_3$, $Li_7La_3Zr_2O_{12}$, or $LiNbO_3$.

7. An all-solid battery comprising:
a positive electrode active material-containing layer;
a negative electrode active material-containing layer; and
a solid electrolyte layer disposed between the positive electrode active material-containing layer and the negative electrode active material-containing layer,
wherein the solid electrolyte layer is a layer including a solid electrolyte,
the solid electrolyte includes electrolyte particles,
each of the electrolyte particles includes a transition metal of Group 4 or Group 5 in the periodic table,
each of the electrolyte particles includes at least one of an O—S—O structure and an O—S—OH structure, and
S in at least one of the O—S—O structure and the O—S—OH structure is bonded to the transition metal.

8. The all-solid battery according to claim 7,
wherein the solid electrolyte includes a water component.

9. The all-solid battery according to claim 7,
wherein the solid electrolyte includes a water component in an amount of from 0.8% by mass to 2.0% by mass.

10. The all-solid battery according to claim 7,
wherein the transition metal is at least one selected from the group consisting of Ti, V, Cr, Mn, Fe, Co, Ni, Cu, Zn, Zr, and Nb.

11. The all-solid battery according to claim 7,
wherein the transition metal is Ti.

12. The all-solid battery according to claim 7,
wherein each of the electrolyte particles includes a base particle and at least one of the O—S—O structure and the O—S—OH structure, and
the base particle is $Li_{0.33}La_{0.55}TiO_3$, $Li_7La_3Zr_2O_{12}$, or $LiNbO_3$.

13. The all-solid battery according to claim 7,
wherein the positive electrode active material-containing layer includes $LiCoO_2$, and
the negative electrode active material-containing layer includes $TiS_2$.

14. The all-solid battery according to claim 1,
wherein each of the electrolyte particles includes on a surface thereof at least one of the O—S—O structure and the O—S—OH structure.

15. The all-solid battery according to claim 7,
wherein each of the electrolyte particles includes on a surface thereof at least one of the O—S—O structure and the O—S—OH structure.

* * * * *